(12) United States Patent
Zhang et al.

(10) Patent No.: US 8,503,356 B2
(45) Date of Patent: Aug. 6, 2013

(54) WIRELESS COMMUNICATION METHOD AND APPARATUS FOR SELECTING CELLS IN AN OFDMA SYSTEM

(75) Inventors: Guodong Zhang, Farmingdale, NY (US); Jung-Lin Pan, Selden, NY (US); Yingming Tsai, Boonton, NJ (US)

(73) Assignee: InterDigital Technology Corporation, Wilmington, DE (US)

( * ) Notice: Subject to any disclaimer, the term of this patent is extended or adjusted under 35 U.S.C. 154(b) by 428 days.

(21) Appl. No.: 11/478,816

(22) Filed: Jun. 30, 2006

(65) Prior Publication Data

US 2007/0047498 A1 Mar. 1, 2007

Related U.S. Application Data

(60) Provisional application No. 60/711,463, filed on Aug. 26, 2005.

(51) Int. Cl.
*H04W 80/04* (2009.01)
*H04W 36/18* (2009.01)
*H04W 88/06* (2009.01)
*H04W 36/30* (2009.01)
*H04B 1/707* (2011.01)
*H04B 1/08* (2006.01)

(52) U.S. Cl.
USPC ........... 370/328; 370/335; 370/331; 370/252; 370/329; 455/438; 455/452.2; 455/439; 455/436; 455/522; 455/450; 455/69

(58) Field of Classification Search
USPC ................................................ 370/328, 335
See application file for complete search history.

(56) References Cited

U.S. PATENT DOCUMENTS

| | | | |
|---|---|---|---|
| 6,223,037 B1 * | 4/2001 | Parkkila | 455/434 |
| 6,807,422 B1 * | 10/2004 | Ekman | 455/439 |
| 7,236,474 B2 * | 6/2007 | Seo et al. | 370/329 |
| 2002/0160781 A1 * | 10/2002 | Bark et al. | 455/450 |
| 2003/0086394 A1 * | 5/2003 | Zeira et al. | 370/331 |
| 2003/0123396 A1 | 7/2003 | Seo et al. | |
| 2004/0110473 A1 | 6/2004 | Rudolf et al. | |
| 2004/0176094 A1 * | 9/2004 | Kim et al. | 455/438 |
| 2004/0203991 A1 * | 10/2004 | Chen et al. | 455/522 |

(Continued)

OTHER PUBLICATIONS $3^{rd}$ Generation Partnership Project; Technical Specification Group Radio Access Network; Physical Layer Aspects for Evolved UTRA (Release 7), 3GPP TR 25.814 V0.1.1 (Jun. 2005).

*Primary Examiner* — Timothy Pham
(74) *Attorney, Agent, or Firm* — Volpe and Koenig, P.C.

(57) ABSTRACT

A wireless communication method and apparatus for selecting cells in an orthogonal frequency division multiple access (OFDMA) system are disclosed. A wireless transmit/receive unit (WTRU) measures a downlink path loss of a current serving cell and at least one other cell. The WTRU determines whether a path loss difference between the serving cell and the other cell is below a threshold. If the path loss difference is below the threshold, the WTRU measures a channel quality indicator (CQI) for each of the plurality of subcarrier blocks in the downlink of the current serving cell and the other cell, respectively. The WTRU reports the CQIs to a serving Node-B which selects a new cell based on the CQIs. Alternatively, a centralized access gateway (aGW) may select the new serving cell/Node-B, or the cell selection decision made by the serving Node-B may be forwarded to another Node-B via the centralized aGW.

7 Claims, 5 Drawing Sheets

U.S. PATENT DOCUMENTS

| | | | |
|---|---|---|---|
| 2004/0219926 A1* | 11/2004 | Kim et al. | 455/452.2 |
| 2005/0047387 A1 | 3/2005 | Frederiksen et al. | |
| 2005/0111408 A1* | 5/2005 | Skillermark et al. | 370/331 |
| 2005/0207367 A1* | 9/2005 | Onggosanusi et al. | 370/315 |
| 2006/0209970 A1* | 9/2006 | Kanterakis | 375/259 |
| 2006/0276191 A1* | 12/2006 | Hwang et al. | 455/436 |
| 2006/0281462 A1* | 12/2006 | Kim et al. | 455/436 |

* cited by examiner

WIRELESS COMMUNICATION METHOD AND APPARATUS FOR SELECTING CELLS IN AN OFDMA SYSTEM

CROSS REFERENCE TO RELATED APPLICATION

This application claims the benefit of U.S. Provisional Application No. 60/711,463 filed Aug. 26, 2005, which is incorporated by reference as if fully set forth.

FIELD OF INVENTION

The present invention is related to a wireless communication system including at least one wireless transmit/receive unit (WTRU), at least one Node-B and a plurality of cells. More particularly, the present invention is related to a method and apparatus for selecting cells in an orthogonal frequency division multiple access (OFDMA) system.

BACKGROUND

The third generation partnership project (3GPP) and 3GPP2 are currently considering a long term evolution (LTE) of the universal mobile telecommunication system (UMTS) terrestrial radio access (UTRA). Currently, OFDMA is being considered for the downlink of the evolved UTRA.

In an OFDMA system, a plurality of orthogonal subcarriers is transmitted simultaneously. The subcarriers are divided into a plurality of localized subcarrier blocks, (also known as resource blocks). FIG. 1 illustrates two localized subcarrier blocks, each comprising four subcarriers, as an example. Each of the localized subcarrier blocks is defined as a set of several consecutive subcarriers. The localized subcarrier block is a basic scheduling unit for downlink transmissions in a conventional OFDMA system. Depending on a data rate or a buffer status, a Node-B assigns at least one localized subcarrier block for downlink transmission for a WTRU.

As with wideband code division multiple access (WCDMA) high speed downlink packet access (HSDPA), it is very difficult to implement inter-Node-B soft handover in the downlink OFDMA system since scheduling of downlink data transmission at different Node-Bs to support hybrid automatic repeat request (H-ARQ) operation is very difficult to coordinate. For soft handover, a new cell has to be selected by either the WTRU or the system. Therefore, it would be desirable to have a fast cell selection method for the OFDMA system.

SUMMARY

The present invention is related to a method and apparatus for selecting cells in an orthogonal frequency division multiple access (OFDMA) system. A WTRU monitors downlink path loss of a current serving cell and at least one other cell. The WTRU determines whether a path loss difference between the serving cell and the other cell is below a threshold. If the path loss difference is below the threshold, the WTRU measures a channel quality indicator (CQI) for each of a plurality of subcarrier blocks in the downlink of the current serving cell and the other cell, respectively. The WTRU reports the CQIs to a serving Node-B which selects a new cell based on the CQIs. Alternatively, a centralized access gateway (aGW) may select the new serving cell/Node-B, or the cell selection decision made by the serving Node-B may be forwarded to another Node-B via the centralized aGW.

BRIEF DESCRIPTION OF THE DRAWINGS

A more detailed understanding of the invention may be had from the following description, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a user equipment (UE), a mobile station, a fixed or mobile subscriber unit, a pager, or any other type of device capable of operating in a wireless environment. When referred to hereafter, the terminology "Node-B" includes but is not limited to a base station, a site controller, an access point or any other type of interfacing device in a wireless environment.

The features of the present invention may be incorporated into an integrated circuit (IC) or be configured in a circuit comprising a multitude of interconnecting components.

Figure 1:
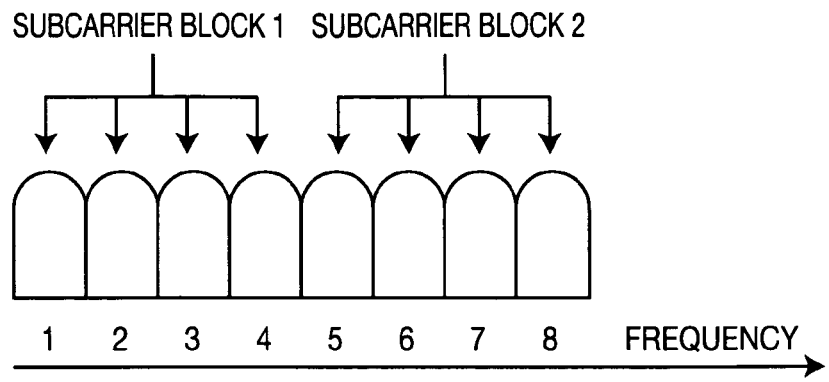
FIG. 1 illustrates a plurality of localized subcarrier blocks associated with downlink transmissions in a conventional OFDMA system.
Figure 2:
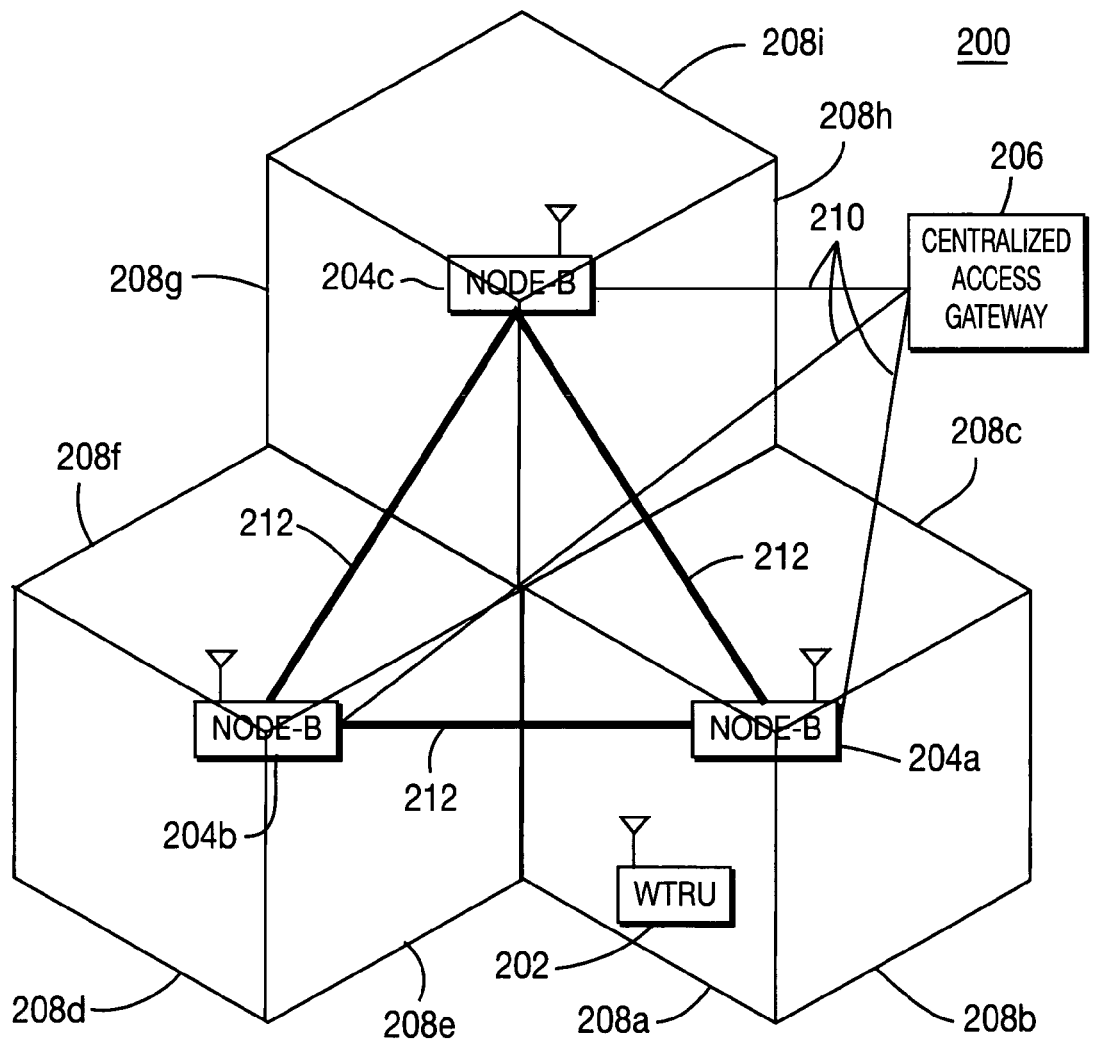
FIG. 2 shows an exemplary wireless communication system configured in accordance with the present invention.

FIG. 2 shows an exemplary wireless communication system 200 configured in accordance with the present invention. The system 200 includes at least one WTRU 202, a plurality of Node-Bs 204a-204c, a plurality of cells 208a-208i and an optional centralized aGW 206. The Node-B 204a controls the cells 208a-208c, the Node-B 204b controls the cell 208d-208f, and the Node-B 204c controls the cell 208g-208i. The WTRU 202 is currently connected to the cell 208a, (i.e., serving cell), and the Node-B 204a, (i.e., serving Node-B), for communication. The Node-Bs 204a-204c may be connected to each other via a high speed link 212. The centralized aGW 206 may also be connected to the Node-Bs 204a-204c via a high speed link 210.

In an OFDMA system, N localized subcarrier blocks are defined and a WTRU may be assigned to M localized subcarrier blocks, where $1 \leq M \leq N$. The cell selection is performed based on the quality of the subcarrier blocks. The cell selection may be performed as fast as per transmission time interval (TTI) or per several TTIs. The time interval during which cell selection is performed is called a cell selection interval.

Figure 3:
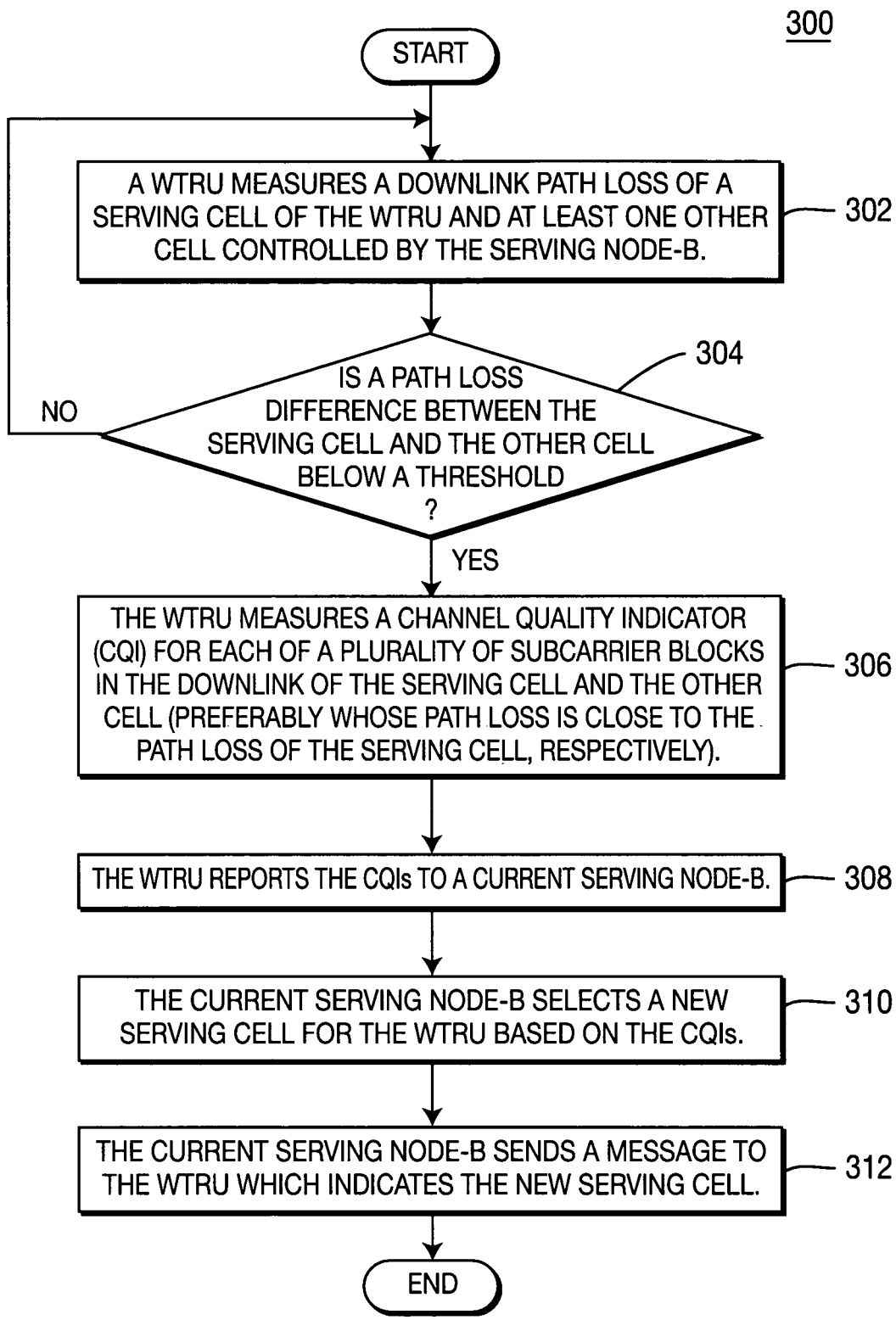
FIG. 3 is a flow diagram of an intra-Node-B cell selection process implemented in the system of FIG. 2 in accordance with a first embodiment of the present invention.

FIG. 3 is a flow diagram of an intra-Node-B cell selection process 300 implemented in the system 200 of FIG. 2 in accordance with a first embodiment of the present invention. A WTRU 202 measures a downlink path loss of a serving cell 208a of the WTRU 202 and at least one other cell 208b, 208c controlled by the serving Node-B 204a (step 302). The downlink path loss is preferably measured with the downlink pilot strength of the serving cell 208a and the other cell 208b, 208c. The WTRU 202 determines whether a path loss difference between the serving cell 208a and the other cell 208b, 208c is below a threshold (step 304). Suppose that the path losses of cells 208a and 208b are $PL_a$ and $PL_b$, respectively. One example definition of the path loss difference between cells 208a and 208b aforementioned is $|PL_a-PL_b|$. If the path loss difference is not below the threshold, the process 300 returns to step 302 to further measure the path loss at the next cell selection interval.

If the path loss difference is below the threshold, the WTRU 202 measures a CQI for each of a plurality of subcarrier blocks in the downlink of the serving cell 208a and the other cell 208b, 208c preferably whose path loss is close to the path loss of the serving cell 208a, respectively (step 306). Based on the downlink data rate of the WTRU 202, the WTRU 202 may occupy M subcarrier blocks ($1 \leq M \leq N$).

The WTRU 202 then reports the CQIs to a current serving Node-B 204a (step 308). The WTRU 202 may report CQIs of the best K subcarrier blocks of each of those cells to the serving Node-B 204a. The K reported subcarrier blocks are those that have the K best CQIs among all N subcarrier blocks for each cell. The value of K is a design parameter, which satisfies $M \leq K \leq N$.

The current serving Node-B 204a then selects a new serving cell for the WTRU 202 based on the CQIs (step 310). The current serving Node-B 204a may simply select the new cell that has the best average CQI, (or weighted average CQI), of M subcarrier blocks out of the K reported subcarrier blocks. Alternatively, the current serving Node-B 204a may select the new cell by considering both CQIs of the WTRU 202 and downlink transmission and CQIs of other WTRUs and a scheduling strategy. After selecting the new cell for the WTRU 202, the current serving Node-B 204a sends a message to the WTRU 202, preferably via a downlink shared control channel, which indicates the new serving cell/Node-B (step 312).

Inter-Node-B cell selection is explained hereinafter. Where several Node-Bs are involved in the cell selection, (i.e., inter-Node-B), the cell selection may be made at different locations. The cell selection decision may be made by a centralized aGW 206 or the current serving Node-B 204a, depending on the particular network architectures. The cell selection may be made as fast as per several TTIs. The actual value of the cell selection interval depends on the network architecture and interface of the evolved UTRA.

Figure 4:
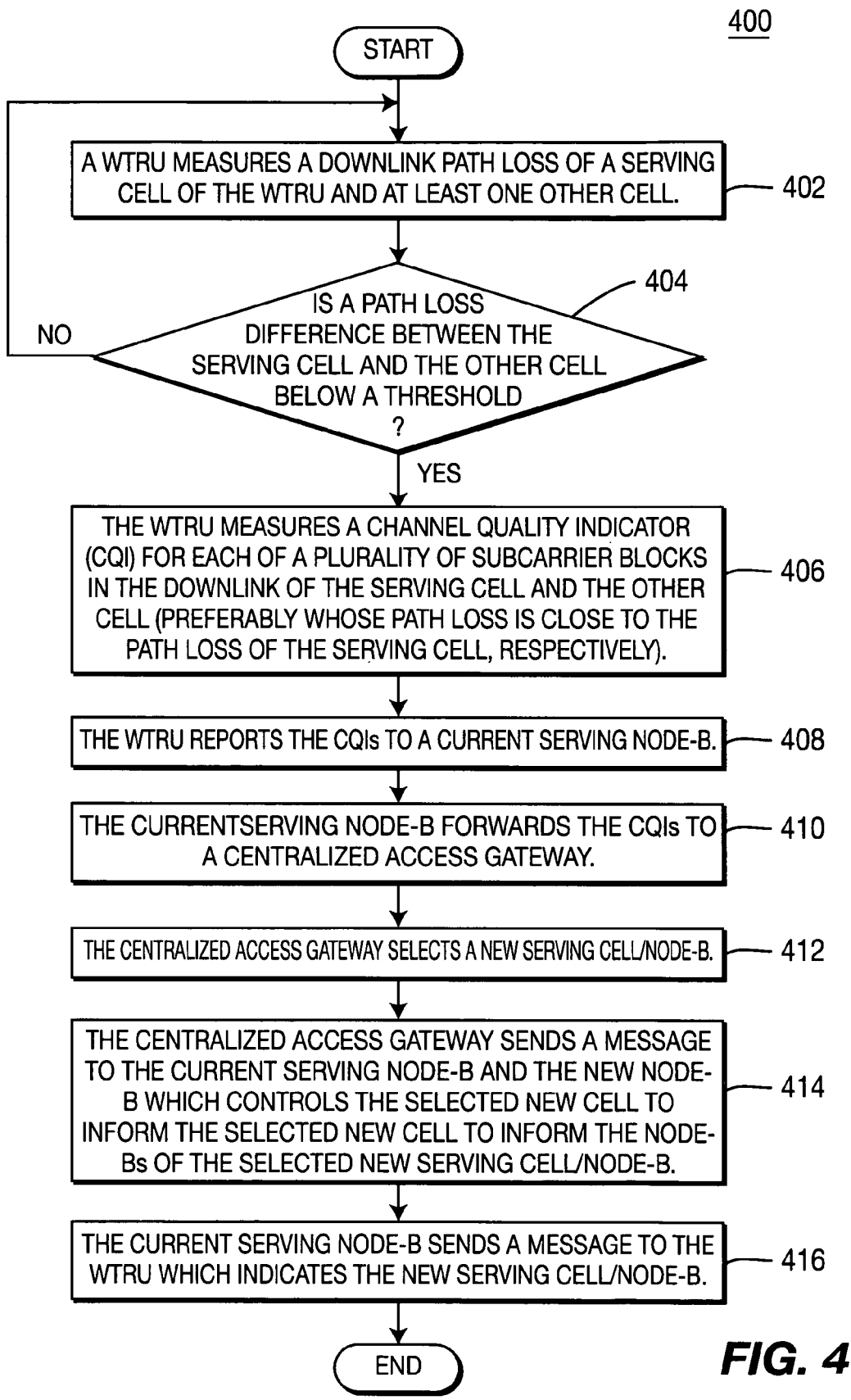
FIG. 4 is a flow diagram of an inter-Node-N cell selection process implemented in the system of FIG. 2 in accordance with a second embodiment of the present invention.

FIG. 4 is a flow diagram of an inter-Node-N cell selection process 400 implemented in the system 200 of FIG. 2 in accordance with a second embodiment of the present invention. A WTRU 202 measures a downlink path loss of a serving cell 208a and at least one other cell 208b-208i (step 402). The downlink path loss is preferably measured with the downlink pilot strength of the serving cell 208a and the other cell 208b-208i. The WTRU 202 determines whether a path loss difference between the serving cell 208a and the other cell 208b-208i is below a threshold (step 404). If the path loss difference is not below the threshold, the process 400 returns to step 402 to further measure the path loss at the next cell selection interval.

If the path loss difference is below the threshold, the WTRU 202 measures a CQI for each of a plurality of subcarrier blocks in the downlink of the serving cell 208a and the other cell 208b-208i preferably whose path loss is close to the path loss of the serving cell 208a, respectively (step 406). Based on the downlink data rate of the WTRU 202, the WTRU 202 may occupy M subcarrier blocks ($1 \leq M \leq N$).

The WTRU 202 then reports the CQIs to a current serving Node-B 204a (step 408). The WTRU 202 may report CQIs of the best K subcarrier blocks of each of those cells 208a-208i to the current serving Node-B 204a. The K reported subcarrier blocks are those that have the K best CQIs among all N subcarrier blocks for each cell 208a-208i. Alternatively, the WTRU 202 may report K best K subcarrier blocks of the best cells controlled by each Node-B 204a-204c. The value of K is a design parameter, which satisfies $M \leq K \leq N$.

Upon receiving the reported CQIs, the current serving Node-B 204a forwards the CQIs to a centralized aGW 206 (step 410). The centralized aGW 206 connects several Node-Bs 204a-204c via a high-speed link 210. The centralized aGW 206 then selects the new serving cell/Node-B for the WTRU 202 (step 412). The centralized aGW 206 may simply select the new serving cell/Node-B that has the best average CQI, (or weighted average CQI), of M subcarrier blocks out of the K reported subcarrier blocks. Alternatively, the centralized aGW 206 may select the new serving cell/Node-B by considering both CQIs of the WTRU 202 and downlink transmission and CQIs of other WTRUs and a scheduling strategy.

The centralized aGW 206 sends a message to the current serving Node-B 204a and the new Node-B, such as Node-B 204b, which controls the selected new cell, and optionally to other Node-Bs, such as Node-B 204c, to inform the Node-Bs 204a, 204b, 204c of the selected new serving cell/Node-B (step 414). Finally, the current serving Node-B 204a sends a message to the WTRU 202, preferably via a downlink shared control channel, which indicates the new serving cell/Node-B (step 416).

Figure 5:
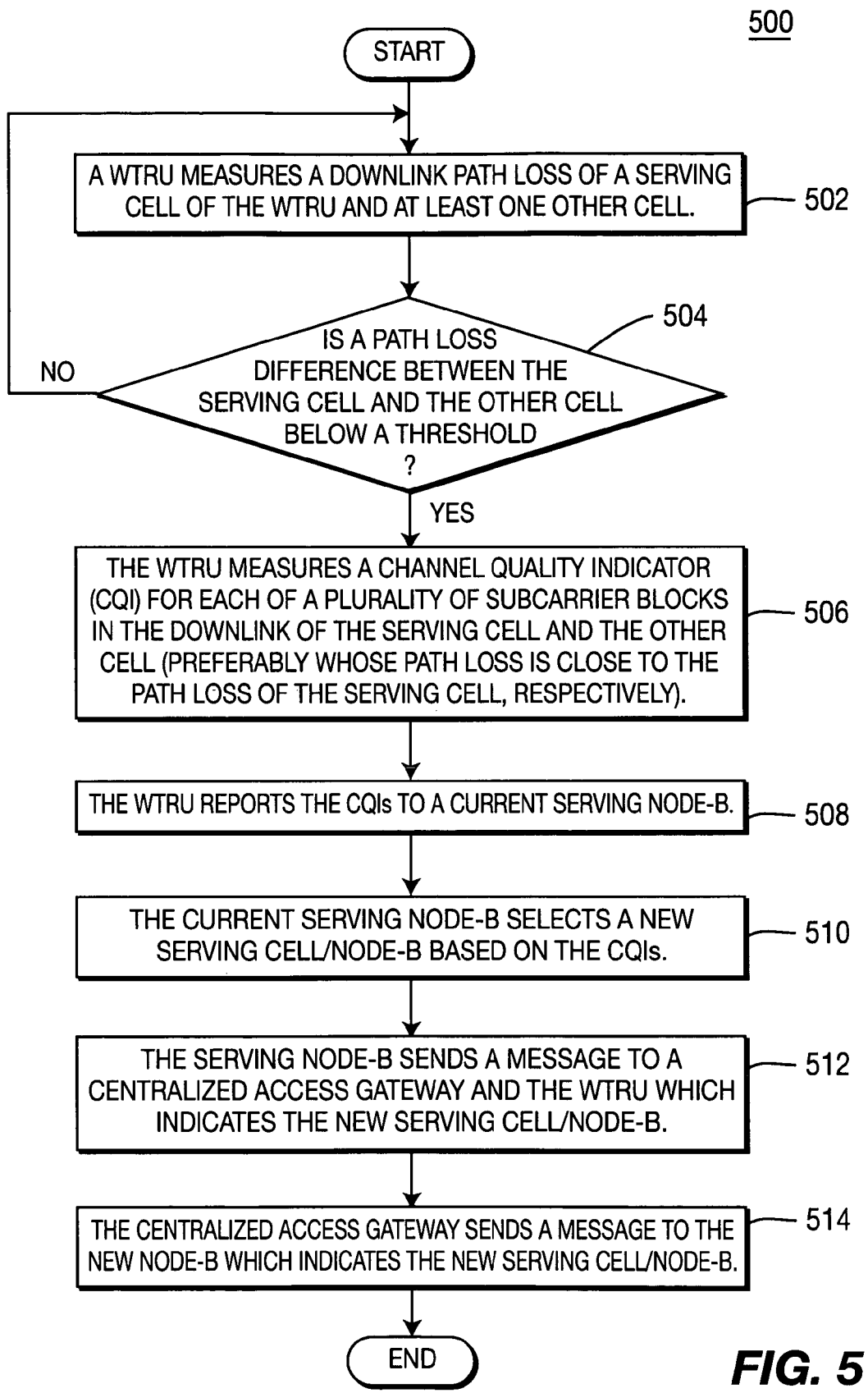
FIG. 5 is a flow diagram of an inter-Node-N cell selection process implemented in the system of FIG. 2 in accordance with a third embodiment of the present invention.

FIG. 5 is a flow diagram of an inter-Node-N cell selection process 500 implemented in the system 200 of FIG. 2 in accordance with a third embodiment of the present invention. A WTRU 202 measures a downlink path loss of a serving cell 208a and at least one other cell 208b-208i (step 502). The WTRU 202 determines whether a path loss difference between the serving cell 208a and the other cell 208b-208i is below a threshold (step 504). If the path loss difference is not below the threshold, the process 500 returns to step 502 to further measure the path loss at the next cell selection interval.

If the path loss difference is below the threshold, the WTRU 202 measures a CQI for each of a plurality of subcarrier blocks in the downlink of the serving cell 208a and the other cell 208b-208i preferably whose path loss is close to the path loss of the serving cell 208a, respectively (step 506). The WTRU 202 then reports the CQIs to a current serving Node-B 204a (step 508). The WTRU 202 may report CQIs of the best K subcarrier blocks of each of those cells 208a-208i to the serving Node-B 204a. The K reported subcarrier blocks are those that have the K best CQIs among all N subcarrier blocks for each cell 208a-208i. Alternatively, the WTRU 202 may report K best K subcarrier blocks of the best cells controlled by each Node-B 204a-204c. The value of K is a design parameter, which satisfies $M \leq K \leq N$.

Upon receiving the reported CQIs, the current serving Node-B 204a selects a new Node-B/cell based on the CQIs (step 510). The current serving Node-B 204a then sends a message to a centralized aGW 206 and the WTRU 202 which indicates the new serving cell/Node-B (step 512). The centralized aGW 206 then sends a message to the new Node-B, such as Node-B 204b, and optionally to other Node-Bs, such as Node-B 204c, which indicates the new serving cell/Node-B (step 514).

Figure 6:
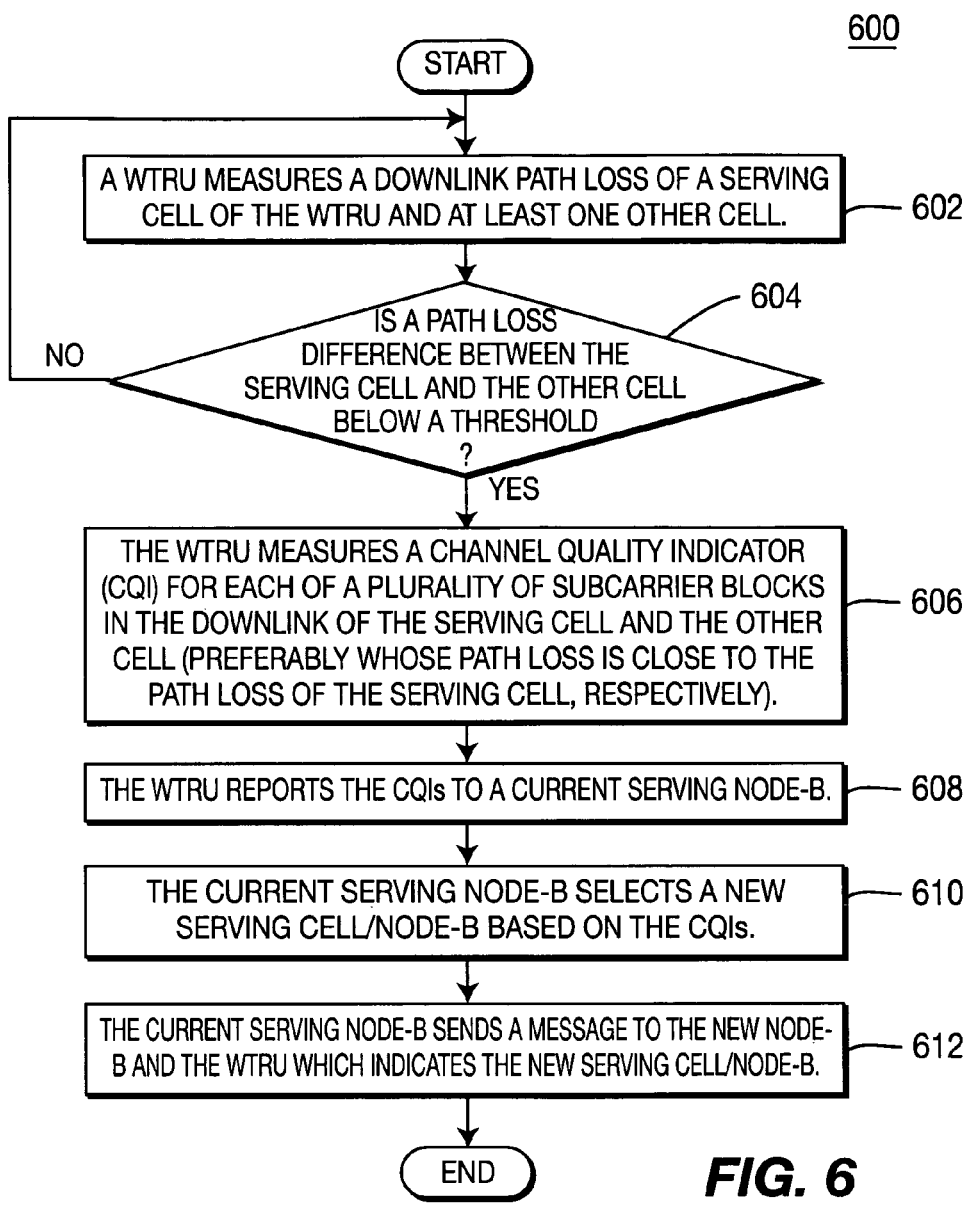
FIG. 6 is a flow diagram of an inter-Node-N cell selection process implemented in the system of FIG. 2 in accordance with a fourth embodiment of the present invention.

FIG. 6 is a flow diagram of an inter-Node-B cell selection process 600 implemented in the system 200 of FIG. 2 in accordance with a fourth embodiment of the present invention. A WTRU 202 measures downlink path losses of a serving cell 208a and at least one other cell 208b-208i (step 602). The WTRU 202 determines whether a path loss difference between the serving cell 208a and the other cell 208b-208i is below a threshold (step 604). If the path loss difference is not below the threshold, the process 600 returns to step 602 to further measure the path losses at the next cell selection interval.

If the path loss difference is below the threshold, the WTRU 202 measures a CQI for each of the plurality of subcarrier blocks in the downlink of the serving cell 208a and the other cell 208b-208i preferably whose path loss is close to the path loss of the serving cell 208a, respectively (step 606). The WTRU 202 then reports the CQIs to the current serving Node-B 204a (step 608). The WTRU 202 may report CQIs of the best K subcarrier blocks of each of those cells 208a-208i to the serving Node-B 204. The K reported subcarrier blocks are those that have the K best CQIs among all N subcarrier blocks for each cell 208a-208i. Alternatively, the WTRU 202 may report K best K subcarrier blocks of the best cells controlled by each Node-B 204a-204c. The value of K is a design parameter, which satisfies M≦K≦N.

Upon receiving the reported CQIs, the current serving Node-B 204a selects a new serving cell/Node-B based on the CQIs (step 610). The Node-Bs 204a-204c are directly connected to each other via a high speed link 212. The current serving Node-B 204a then sends messages to the new Node-B, such as Node-B 204b, and optionally to other Node-Bs, such as Node-B 204c, via the high speed link 212 and to the WTRU 202 preferably via the downlink shared control channel, which indicates the new serving cell/Node-B (step 612).

Figure 7:
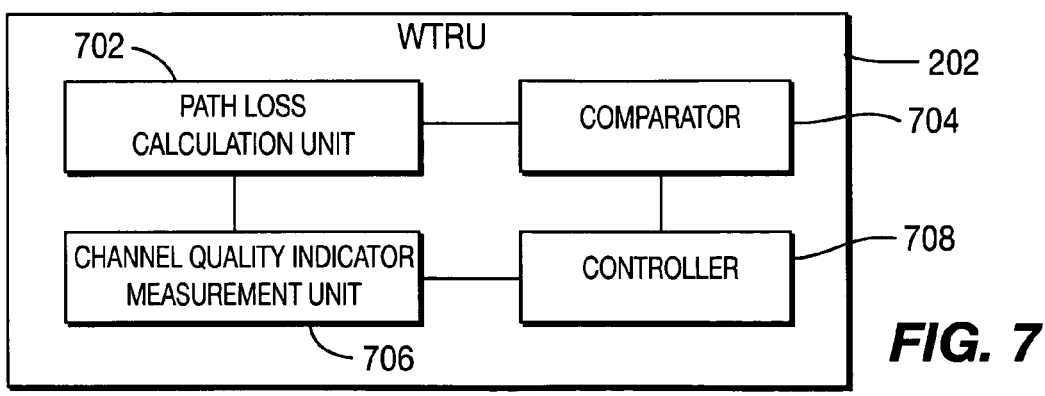
FIG. 7 is an exemplary block diagram of a WTRU used in the system of FIG. 2 in accordance with the present invention.

FIG. 7 is an exemplary block diagram of the WTRU 202 used in the system 200 of FIG. 2 in accordance with the present invention. The WTRU 202 includes a path loss calculation unit 702, a comparator 704, a CQI measurement unit 706 and a controller 708. The path loss calculation unit 702 calculates a downlink path loss of a serving cell 208a and at least one other cell 208b-208i preferably based on pilot channel strength. The comparator 704 determines whether a difference of the path losses of the serving cell 208a and the other cell 208b-208i is below a threshold. The CQI measurement unit 706 measures a CQI for each of the plurality of subcarrier blocks in the downlink of the serving cell 208a and the other cell 208b-208i, respectively, when a cell selection procedure is triggered. The controller 708 reports the CQIs to a current serving Node-B 204a.

Although the features and elements of the present invention are described in the preferred embodiments in particular combinations, each feature or element can be used alone without the other features and elements of the preferred embodiments or in various combinations with or without other features and elements of the present invention.

What is claimed is:

1. A method of selecting a new cell that is to serve a wireless transmit/receive unit (WTRU), the method comprising:

measuring a downlink path loss, $PL_a$, of a serving cell that is currently serving the WTRU during a current cell selection interval;

measuring a downlink path loss, $PL_b$, of at least one other cell that is not currently serving the WTRU during the current cell selection interval;

calculating a path loss difference, $|PL_a-PL_b|$, between the serving cell and the other cell;

determining whether the calculated path loss difference, $|PL_a-PL_b|$, is below a threshold;

on a condition that the path loss difference, $|PL_a-PL_b|$, is not below the threshold, measuring downlink path loss during a next cell selection interval; and on a condition that the path loss difference, $|PL_a-PL_b|$, is below the threshold, measuring a channel quality indicator (CQI) for each of a plurality of subcarrier blocks in the downlink of the serving cell, respectively, reporting the measured CQIs and receiving a message indicating a new serving cell that was determined to serve the WTRU based on the CQIs.

2. The method of claim 1 wherein K best CQIs of the serving cell and the at least one other cell are selected, respectively, and each K best CQIs are reported.

3. The method of claim 1 wherein K best subcarrier blocks of the cells are reported.

4. A wireless transmit/receive unit (WTRU) comprising:

a path loss calculation unit configured to measure a downlink path loss, $PL_a$, of a serving cell that is currently serving the WTRU during a current cell selection interval and measure a downlink path loss, $PL_b$, of at least one other cell that is not currently serving the WTRU during the current cell selection interval;

a comparator configured to:

calculate a path loss difference, $|PL_a-PL_b|$, between the serving cell and the other cell, and determine whether the calculated path loss difference, $|PL_a-PL_b|$, is below a threshold, wherein the path loss calculation unit is further configured to measure downlink path loss during a next cell selection interval on a condition that the path loss difference, $|PL_a-PL_b|$, is not below the threshold;

a channel quality indicator (CQI) measurement unit configured to measure a CQI for each of a plurality of subcarrier blocks in the downlink of the serving cell and the other cell, respectively, on a condition that the path loss difference, $|PL_a-PL_b|$, is below the threshold; and a controller configured to report the measured CQIs.

5. The WTRU of claim 4 wherein the controller is configured to select K best CQIs of the serving cell and the at least one other cell, respectively, and reports each K best CQIs.

6. The WTRU of claim 4 wherein the controller is configured to report K best subcarrier blocks of the cells.

7. An integrated circuit (IC) comprising the path loss calculation unit, the comparator, the channel quality indicator (CQI) measurement unit and the controller of the WTRU of claim 4.

* * * * *